July 5, 1960 R. H. GARRETT 2,943,809
TENSION CONTROL APPARATUS
Filed Oct. 21, 1954 2 Sheets-Sheet 1

INVENTOR.
ROSCOE H. GARRETT
BY
ATTORNEYS

INVENTOR,
ROSCOE H. GARRETT.

United States Patent Office 2,943,809
Patented July 5, 1960

2,943,809

TENSION CONTROL APPARATUS

Roscoe H. Garrett, Kenosha, Wis., assignor to Eaton Manufacturing Company, Cleveland, Ohio, a corporation of Ohio Filed Oct. 21, 1954, Ser. No. 463,745

10 Claims. (Cl. 242—75.51)

The present invention relates to an electrical apparatus and more particularly to a control circuit for an electromagnetic clutch in the power drive of a constant tension reel winding or unwinding device.

Broadly, the present invention comprehends the provision of a compensation circuit for providing in a reel winding or unwinding apparatus control circuit a signal voltage proportional to the rate of change of speed or acceleration of the reel and being polarized in accordance with increase or decrease of said speed. The signal voltage so developed is applied to modify a grid voltage of a grid controlled power rectifier which provides excitation to a coil of an electromagnetic clutch in the power system of the winding apparatus and offers an added corrective effect to the system in proportion to the amount of deviation from desired operation.

In present day processing of many types of materials, it is very desirable and important that a constant tension be maintained on a moving strip of material such as, paper, plastic, ferrous and non-ferrous metal and since it is often desirable, if not necessary, that use of rider or dancer rolls be avoided, it becomes urgent that other controlling means be employed.

The primary difficulty in controlling tension is that of determining the tension of a moving strip and accordingly, since it is desirable that information related to, or a function of, the required tension be used as a signal for actuating the control mechanism, an accurate control is difficult to obtain.

Many arrangements, including those employing rider or dancer rolls, are known for developing in a control circuit a signal voltage responsive to the speed of a driven element for correcting any errors or deviations in the speed of the driven element. None, however, have so utilized a circuit as the present invention for developing a pair of signal voltages proportional in one instance to the deviation in speed of the driven element from the desired speed and in a second instance to the rate of change of speed or acceleration of the driven element for providing a combination voltage to enhance the correcting effect on the apparatus in accordance with the need therefor.

It is accordingly an object of the present invention to provide a control circuit for an electromagnetic clutch apparatus overcoming the deficiencies of prior control circuits.

It is another object of the present invention to provide a control circuit for an electromagnetic clutch apparatus that develops a correcting signal proportional in magnitude to the error and to the rate of increase or decrease thereof.

It is another object of the present invention to provide a control circuit for an electromagnetic clutch apparatus that is simple of design and is readily adaptable to known control circuits of a nature.

It is another object of the present invention to provide a control circuit for an electromagnetic clutch apparatus that is automatically functioning without any manual manipulation after an initial adjustment.

Other objects and advantages of the present invention will appear from a perusal of the following description considered with reference to the accompanying drawings in which.

Most applications involving controlled tension are on windup and unwind stands utilizing two basic types of drive systems. In one type, the power drive is applied peripherally to the roll surface while in the other type the power drive is applied to the core or center of the roll and are referred to as "surface wind" and "center wind," respectively. The present application is primarily concerned with center wind systems and only this system will be considered in detail.

In the center-wind system wherein the power is applied to the mandrel or center of the roll, constant torque input does not give constant tension because tension is a function of the roll diameter which is continuously changing as material builds up on the roll. Accordingly, the ideal constant tension center-wind system must vary the torque input in accordance with the required function automatically without the use of a dancer or follower.

Early center-wind drives using electromagnetic couplings employ clutch motor type control. In these cases, tension requirements are not too critical, and it may be necessary to adjust the clutch excitation two to three times during roll buildup. Temporarily paralleling applications using clutch motor control are installations using dancers or followers where more critical tension requirements exist. This type of control is fairly satisfactory, although there are a number of applications where the dancer or follower roll is objectionable for various reasons. Therefore, an electronic constant tension control is offered as a supplement to the control systems mentioned heretofore.

In providing constant tension with a center-wind system for a given delivery speed, the electronic tension control must cause the electromagnetic coupling torque versus speed characteristic to follow the general form of the rectangular hyperbola described by the equation:

$$Y = \frac{1}{X} \quad (1)$$

as the material roll builds up from mandrel to maximum diameter. In a system where the tension of the strip material is F, the torque applied to the mandrel is $t$ and the radius of the material wound on the mandrel is $r$, the following relation exists:

$$F = \frac{t}{r} \quad (2)$$

at any instant during buildup. Rotational speed of the material roll, as measured in revolutions per minute, is related to surface or delivery speed S and roll radius $r$ by the equation:

$$n = \frac{S}{2\pi r} \quad (3)$$

Combining Equations 2 and 3 results in:

$$t = \frac{FS}{2\pi n} \quad (4)$$

which is an expression for torque in terms of tension F, delivery speed S and rotational speed $n$.

Inasmuch as tension F and delivery speed S are to be held constant as the roll builds up, these may be lumped with the numerical constant of $2\pi$ to give:

$$t = \frac{K}{n} \tag{5}$$

this relationship being similar to Equation 1.

Figure 1:
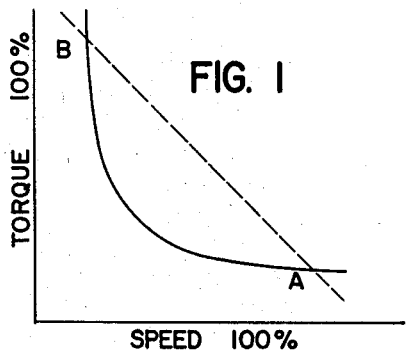
Fig. 1 is a graph employed in explaining the theory of the present invention.

Using Equation 5 a graphic representation may be drawn showing the required torque-speed relationship as the solid line in Fig. 1 of the drawings.

If a standard electromagnetic coupling with its associated electronic speed control is made to regulate broadly enough, a speed versus torque curve as shown in the dash line in Fig. 1, may be obtained which passes through extreme points A and B of the required curve. While this type of control results in a significant departure from the required constant tension during the transition between these points, an analysis of its operation clears the way for an understanding of the complete control. To facilitate explanation of the control circuit, reference is made to Fig. 3 wherein is shown a rectifier arrangement RA for producing current for a clutch coil CC, and a generator GN and battery system BA replacing the control system of the present invention. This circuit shows generator GN, which is driven by and must rotate at the mandrel speed, and battery reference supply BA connected such that the voltage difference obtained by subtracting the rectified generator voltage (across a resistor R1) from the battery reference voltage is applied to the coupling field through a half-wave rectifier RT. Considering the coupling output and thus, the generator, as operating at a speed corresponding to that of point A of the curve in Fig. 1 when the material roll is started at minimum diameter, resistor R may be adjusted such that required torque is obtained. Assuming the torque of the electromagnetic coupling to be proportional to its field excitation, a relatively low value of voltage is required for this point. This is, the generator output is only slightly less than the reference voltage. With fixed delivery speed, the coupling, and so the generator, must slow down as material begins to build up on the mandrel. As this occurs, the resultant voltage impressed on the coupling field increases, giving more output torque. Provided basic conditions are set up properly, a continuation of roll build-up results in the generator slowing down in a manner such that torque is increased along the dashed line of Fig. 1 from point A to point B.

Figure 3:
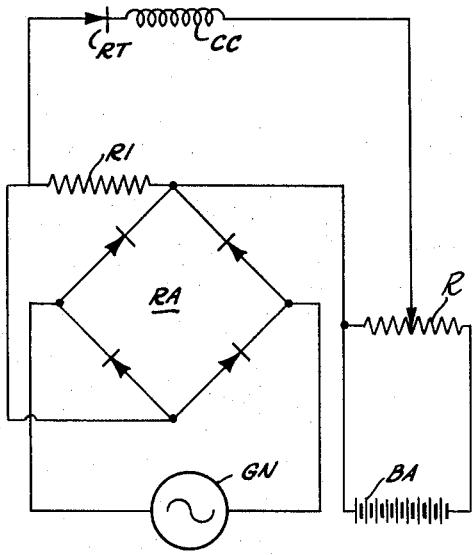
Fig. 3 is a schematic representation of a control circuit employed in explaining the present invention.

Reflection on the operation of the circuit of Fig. 3 discloses that the resulting characteristic curve depends upon a linear relationship between generator speed and output voltage. As the required torque-speed curve is not linear, it follows that proper departure from linearity on the part of the generator speed-voltage characteristic should lead to an overall torque-speed relationship generally in keeping with that required for constant tension.

Figure 2:
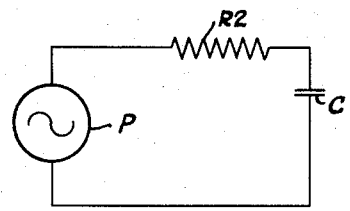
Fig. 2 is a schematic representation of a control circuit employed in explaining the present invention.

Modification of the generator characteristic must result in a stepless increase in volts per unit speed increment as the generator is slowed down from its maximum speed at point A in Fig. 1. That is, the curve of voltage versus speed is to be flat at high speeds and steep at low speeds with gradual transition between the two extremes. The effect of variable frequency on the voltage drop across the resistance in a resistance-capacitance circuit (including a resistor R2 series-connected in a loop circuit with a condenser C and a source of A.C. power, indicated at P) provides this trend. That is, considering the circuit of Fig. 2, it is seen that the voltage $e$, arrived at using equation:

$$e = \frac{e_s X_c}{\sqrt{R^2 + X_c^2}}$$

takes the characteristic shown graphically as the speed of the generator is varied. It is significant that the slope is steep at low speeds and flat at high speeds as required.

By rectifying the voltage $e$ and using this in place of the straight generator voltage in the circuit of Fig. 3, it is seen that a curve approximating that shown as the required curve in Fig. 1 may be obtained.

In actual practice, a low power A.C. tachometer generator is used in conjunction with a low power, rectified, regulated, adjustable reference voltage with the resultant acting as a grid signal input to a thyratron type power and voltage amplifier.

The underlying principles and theory of the control circuit, as well as the relationship between clutch torque and voltage applied across its coil having been established, it is possible to proceed to the electronic circuit and observe how it accomplishes governor speed control by automatically regulating the coil current.

Figure 4:
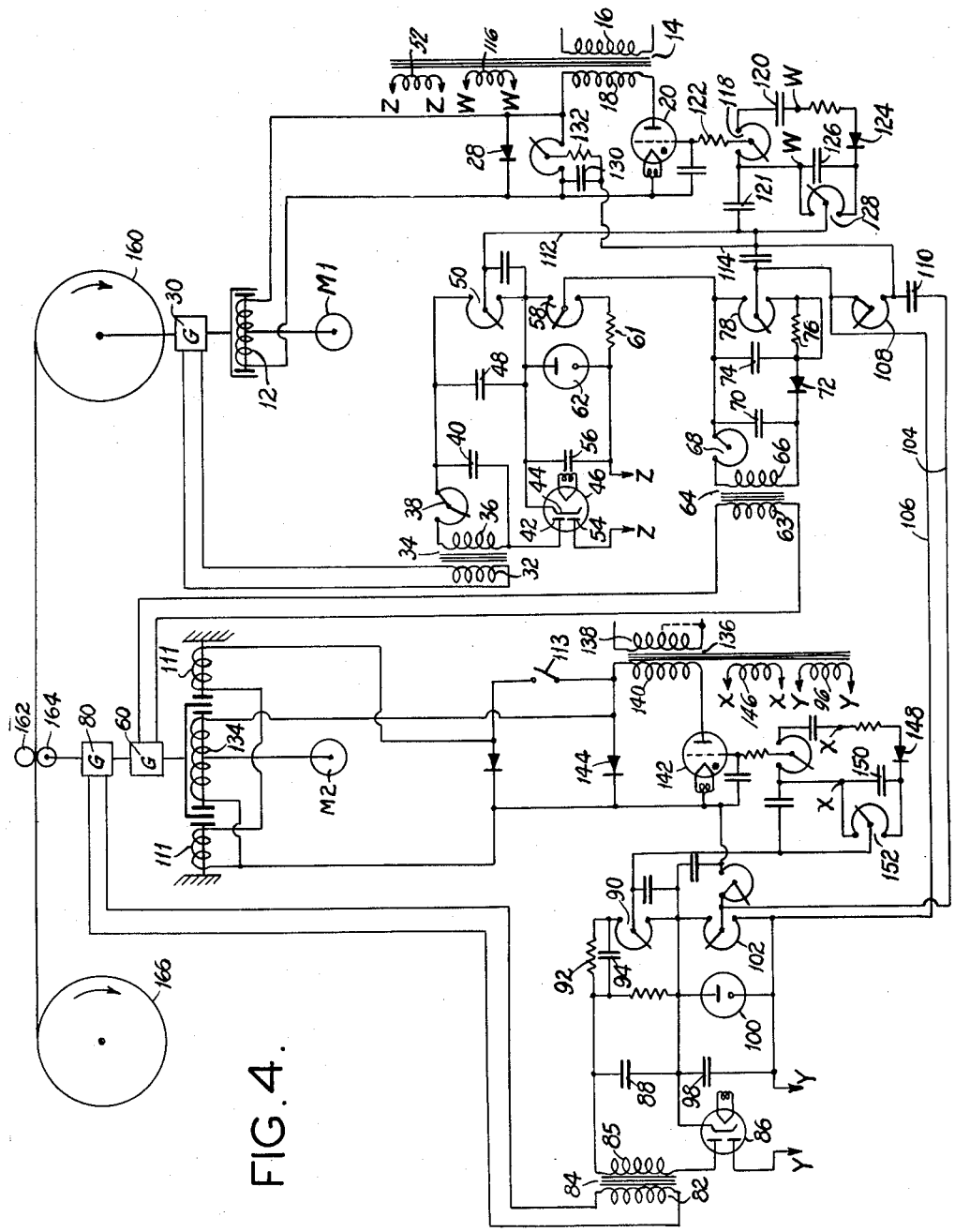
Fig. 4 is a schematic representation of a control circuit incorporating the present invention.

Referring now more particularly to Fig. 4 of the drawings for a detailed description of a specific embodiment of the invention, an electric motor is indicated at reference character M1. This motor is connected to drive a winding reel 160 by means of an electric clutch, which includes a D.C. field coil 12. This clutch may be any of the conventional types, such as the magnetic fluid type, but is preferably an eddy-current slip clutch. Coil 12 is energized by current derived from a main power source including the transformer 14 having a primary winding 16 and a secondary winding 18, and a grid-controlled gas tube rectifier or thyratron 20. Primary winding 16 is connected across a pair of power mains and secondary winding 18 is serially connected with the clutch coil 12 and the plate-cathode circuit of rectifier tube 20. A suitable dry rectifier 28, preferably of the selenium type, is connected across coil 12 to provide a high resistance parallel path to current flowing through coil 12 due to voltage applied thereto and a low resistance series path to current flowing in coil 12 due to voltages induced therein to provide a smooth coil current during the half cycle that tube 20 is not conducting.

The thyratron rectifier tube controls the magnitude of the direct voltage applied to coil 12. The plate-cathode current of the tube is controlled by a low potential applied to the grid, it being understood that more positive grid voltages increase conduction in tube 20 and consequently flow of current in coil 12 and that less positive grid voltages result in diminished current in coil 12.

The voltage applied to the grid of tube 20 is a resultant derived from various component circuits about to be described and is the algebraic sum of these various components.

A governor generator voltage proportional to the reel speed is derived in one of the component circuits and, for this purpose, a local governor generator 30 driven by the load or reel winder 160 delivers an alternating voltage which has an amplitude and frequency which are functions of the speed of wind-up reel 160 to the primary 32 of transformer 34, the secondary 36 of which is serially connected with the fixed terminals of an RC circuit constituted by a potentiometer 38 and a capacitor 40. The voltage developed across capacitor 40 is applied to one section 42—44 of a duo-diode tube 46 for half wave rectification thereby and thereafter to a filter capacitor 48 for minimizing the ripple in the rectified voltage. The D.C. voltage signal so derived is a non-linear (see solid line curve AB of Fig. 1) function of the rotational speed of reel 160. This D.C. signal is applied to the fixed terminals of a potentiometer 50 to be combined with other component voltages to be described.

The potentiometer 38 is commonly called the "warp" control since the value of resistance in series with capacitor 40 determines the shape or warp of the curve as shown in the solid line in Fig. 1. Potentiometer 50 is commonly called the "slope" control since its adjustment determines the slope of the solid line curve AB in Fig. 1.

A reference voltage is derived in a second component circuit which includes a transformer, the secondary 52 of which is shown, for introducing an alternating voltage which is rectified in a second section 54—44 of duo-diode 46, filtered by capacitor 56 and applied to a pair of fixed terminals of a potentiometer 58 through a resistor 61. The potential is regulated by a voltage regulator tube 62 to supply a constant potential across potentiometer 58. It should be noted that the voltages derived from the governor generator 30 and from the reference source and appearing across potentiometers 50 and 58, respectively, are in series-opposing relationship so as to have opposing effects on the grid voltage of tube 20 for a purpose to be explained hereinafter.

Potentiometer 58 is commonly called the "stall tension" control since its adjustment controls the amount of fixed, positive voltage impressed in the grid circuit of tube 20. This voltage is independent of the speed of the remote governor generator for use in giving tension under stalled conditions when the remote governor generator speed is actually at zero.

An additional component of the resultant grid voltage is derived from a remote governor generator 60 driven by some component of the apparatus whose motion is proportional to strip speed (such as two rolls 162 and 164), the voltage output of which is applied to a primary winding 63 of a transformer 64. Secondary winding 66 of transformer 64 is connected serially with a potentiometer 68 and capacitor 70, the voltage across the latter being rectified and filtered by a suitable rectifier 72 and a capacitor 74 and applied through a resistor 76 to a potentiometer 78.

Potentiometer 68 and capacitor 70 provide a warping or shaping of the voltage component produced by generator 60 similar to that provided by potentiometer 38 and capacitor 40 described above. Since this voltage is introduced with opposite polarity to that originating at local generator 30, calibration relative to material speed is effected.

The potentiometer 78 is commonly called the "tension" control in that it provides a reference voltage against which the local governor generator 30 voltage must work in order to produce the required torque vs. speed curve. The tension control potentiometer is located at the operator's control station and may be adjusted as desired to set the proper tension for various widths and weights of material being wound or unwound. The D.C. control signal developed across the rotor and one side of potentiometer 78 is, therefore, a non-linear function of the speed of the material as sensed by rolls 162 and 164, the shape of the functional curve being determined by the adjustment of potentiometer 68.

Another component of the resultant or composite grid voltage for tube 20 is derived from the potential developed across potentiometer 102, originating at transformer secondary 96 and rectified in one section of duo-diode rectifier 86. The rectified voltage is filtered by capacitor 98 and regulated by voltage regulator tube 100. This potential is applied through lines 104 and 106 to a series combination of potentiometer 108 and capacitor 110 such that any rotation of potentiometer 102 causes a voltage to exist across potentiometer 108 due to charging or discharging of capacitor 110. As the arm of potentiometer 102 is rotated counterclockwise, a positive voltage with respect to the grid of tube 20 exists across potentiometer 108. As the arm of potentiometer 102 is rotated clockwise, a negative voltage with respect to the grid of tube 20 exists across potentiometer 108. The magnitude of this voltage, positive or negative with respect to the grid of tube 20, is a function of the magnitude and rate of rotation of the arm of the potentiometer 102.

It is to be noted that the voltages developed across the potentiometers 50, 58, 57, and 108 as described hereinabove are algebraically combined by appropriate line connections between the potentiometers and applied to the grid-cathode circuit of tube 20 through line connections 112 and 114.

A grid bias and rider wave are applied to the grid of tube 20 by virtue of elements 116—128. A transformer secondary 116 applies an alternating voltage wave across a serially connected potentiometer 118 and capacitor 120 and the movable arm of potentiometer 118 is connected to the grid of tube 20 through a resistor 122. One end of potentiometer 118 is connected to the cathode of tube 20 through a capacitor 121 for providing the rider wave for a purpose to be described.

The voltage from transformer secondary 116 is also rectified by a dry rectifier 124, filtered by a capacitor 126, and applied to a potentiometer 128, the movable arm of which is connected to the cathode of tube 20 through potentiometers 50, 58, 78, 108, line 114 and a parallel capacitor-resistor combination 130, 132.

Figure 5:
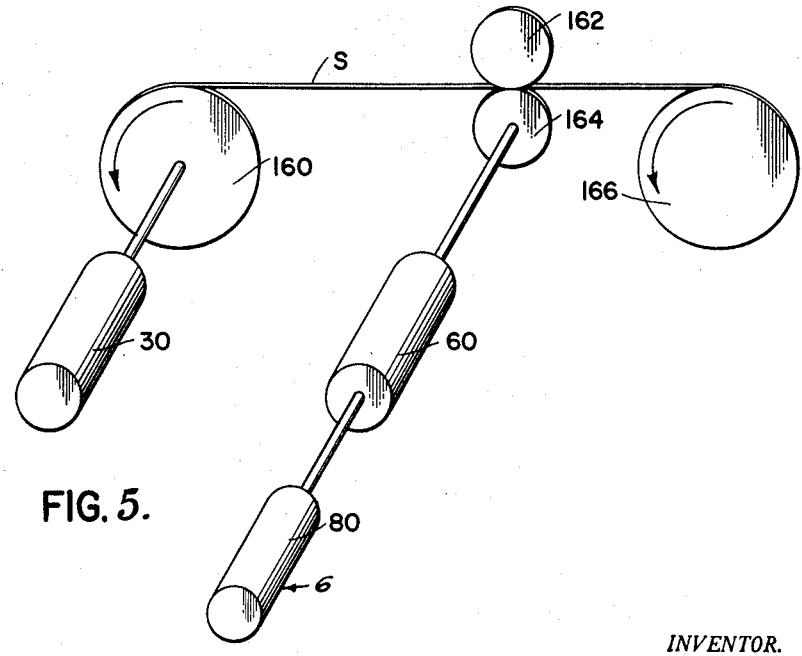
Fig. 5 shows the arrangement of reels and rollers in a winding apparatus.

Coils 134 and 111 are clutch and brake coils, respectively, of a master drive which powers pinch rolls 162 and 164, which actually represents a processing machine. These rollers are shown in Fig. 5. This master drive is a conventional adjustable-speed drive employing the reference voltage and a governor generator 80 feed-back system known to the art. This master drive controls the delivery or material speed. The brake field 111 is simply used for rapid emergency stopping of this drive, by closing a switch 113.

The A.C. voltage developed by generator 80 has an amplitude proportional to that of the velocity of the material being fed to reel 160 by rolls 162 and 164. This voltage is applied to a primary 82 of a transformer 84 which has a secondary winding 85 connected to a half wave rectifier circuit constituted by one half of a duo-diode rectifier 86 and a filter condenser 88. The negative polarity output terminal of this rectifier is connected through a parallel-connected resistor 92 and condenser 94 network to a potentiometer 90. The grid-cathode signal controlling the conduction of a gaseous rectifier tube 142, and thus the coupling of the electric clutch (which includes the D.C. field coil 111) between a drive motor M2 and rolls 162 and 164, is therefore a composite of the D.C. signal from potentiometer 90 and the adjustable D.C. reference potential across potentiometer 102.

This composite D.C. grid-cathode signal has impressed on it an A.C. rider wave by means of the component indicated at reference numerals 146—152 which are interconnected and function in a manner similar to that described above in regard to components 116—128.

Referring now more particularly to Fig. 5 of the drawings the mechanical interconnections of the reel 160, rolls 162 and 164, generators 30, 60 and 80 are shown. Winding reel 160 is driven by a motor M1 through the clutch energized by coil 12 and is connected to drive generator 30 at the same speed as reel 160. The reel 160 winds thereon a strip of material S which extends between a pair of rollers 162, 164 to an unwinding reel 166. Driven by roller 164 are remote governor generators 60 and 80. Since the rotation of rollers 162 and 164 varies directly with the speed of strip S, the rotation of governor generators 60 and 80 and consequently the output voltage of these generators also vary directly with the speed of strip S.

For an understanding of the operation of the system herein, it is assumed that the wind-up reel 160 is rotating as to submit the strip S to constant tension and that as the material S builds up on reel 160, the reel diminishes in speed. The consequence of such diminution of speed is the concomitant diminution of output voltage of generator 30 and consequently of an increased voltage bias on the grid of tube 20 resulting in increased conduction of the tube and increased coupling in clutch coil 12 to provide an increased torque on reel 160 to accommodate the enlarged reel. Also, if the speed of strip S should diminish so as to reduce the speed of generator 80, the bias applied to the grid of tube 142 becomes less negative to increase tube conduction and consequently to increase energization of clutch 134 and correct for the diminution of speed.

In a manner similar to that described above with respect to generator 60, generator 80 produces voltage signals for correction of the speed of unwind reel 166. Actually the generator 80 is not directly employed in correcting the speed of the unwinding or rewinding reel drive. Its primary function in this regard is to ascertain that delivery speed remains constant at the value set by potentiometer 102. Generator 60, which runs at a speed proportional to delivery speed, provides the signal for the unwind or rewind control unit, calibrating the latter so that the proper torque versus speed characteristic is obtained at any delivery speed.

In the system, the speed of the strip material may be adjusted by the speed of rollers 162 and 164 through energization of clutch coil 134.

It is often necessary to compensate for inertia of the reels during periods when speed is being changed in order to have the wind-up unit of the sectionalized system follow the roller drive with suitable precision. This problem is particularly difficult when a slave drive is being added to an existing system. If the master drive is controlled by a potentiometer such that the speed at which it runs is proportional to potentiometer rotation, a simple system may be employed to increase or decrease the slave drive torque during acceleration or deceleration.

In the present system, the speed of the roller drive 162 and 164 is controlled by the output of generator 80 and the settings of potentiometers 90 and 102, while the reference voltage for the wind-up reel is established by the generator 60, and associated circuitry 63 to 78 provides a base voltage proportional to the desired speed of the wind-up reel. A second signal is added to this base voltage by virtue of the line connections 104 and 106 from potentiometer 102 to the potentiometer-capacitor combination 108, 110. The voltage developed across potentiometer 102 acts to initially charge capacitor 110 through the effective resistance of potentiometer 108 and during periods of constant voltage across potentiometer 102, the voltage across 110 remains constant, no current flows through potentiometer 108, and the second signal is accordingly zero. It is now assumed that an adjustment is made of potentiometer 102 by a counterclockwise rotation of the arm thereof so as to increase the speed of the roller drive. The voltage across lines 104, 106 is now reduced since a smaller portion of potentiometer 102 is applied to lines 104, 106 and accordingly capacitor 110 having a larger voltage thereacross than the voltage across lines 104, 106 discharges through potentiometers 108 and 102. This transient current causes an IR drop in potentiometer 108 and constitutes the second signal above mentioned. The second signal is of the polarity as to apply a voltage to the grid of tube 20 that is positive with respect to the cathode thereof to increase conduction of tube 20 and consequently excitation of clutch coil 12 to increase the torque applied to wind-up reel 160. Conversely, if an adjustment of potentiometer 102 is made so as to decrease the speed of the roller drive, a negative potential results from a discharge of capacitor 110 to apply a negative impulse to the grid of tube 20.

Since the speed of the master drive is controlled by potentiometer 102, any change in the setting of this potentiometer causes acceleration or deceleration on the part of this drive and thus, on the part of the delivery speed. Since the charge current of the condenser 110 is a function of the rotation of potentiometer 102, this constitutes an automatic correction in the rewind or unwind control circuit accompanying an acceleration or deceleration on the part of the master drive and thus the delivery speed.

Thus, the wind-up control input voltage is a combination of the reference generator output and the rate circuit output with the latter polarized such that it adds to the reference voltage during acceleration and subtracts therefrom during deceleration. This results in additional torque output on the part of the wind-up drive during accelerating periods and torque reduction during slowdown. By a proper selection of values for components of the system, the wind-up drive can be made to follow the master quite closely under all normal operating conditions.

It is seen by the foregoing description that a novel feature is incorporated in the constant tension control circuit in the application of an acceleration rate potential to the thyratron control grid to provide a more responsive and accurate control.

This invention has been described in connection with certain specific embodiments, but the principle involved is susceptible of numerous other applications that will readily occur to persons skilled in the art. The invention, therefore, is limited only as indicated by the scope of the appended claims.

What I claim is:

1. In material reeling apparatus which includes a rotary reel on which material is wound, a motor, an electric clutch connecting said motor with said reel, and a field coil for varying the coupling between said motor and said reel; a tension control system comprising a generator driven by said reel and adapted to produce an A.C. voltage having an amplitude and frequency which are proportional to said reel speed, an RC circuit across which said voltage is impressed, said RC circuit comprising a resistor series-connected with a condenser, a rectifier connected across one of said components of said RC circuit and adapted to produce a first D.C. voltage signal nonlinear in relation to reel speed, a circuit providing a second control signal including a resistor and a condenser serially connected across an adjustable D.C. potential source, and means for controlling the energization of said field coil in response to a composite of said first and second signals whereby the tension of the material being wound on the reel is controlled in a predetermined fashion over a wide range of material winding speeds.

2. In material reeling apparatus which includes a rotary reel on which material is wound, a first motor, a first electric clutch connecting said motor with said reel, and a first field coil for varying the coupling between said motor and said reel; a tension control system comprising a first generator driven by said reel and adapted to produce a first D.C. voltage signal which is a function of reel speed, a feed roll adapted to feed said material to said reel, a second motor, a second electric clutch connecting said motor with said roll, a second field coil for varying the coupling between said second motor and said roll, an adjustable D.C. potential source for controlling the energization of said second field coil thereby to control the velocity and acceleration of said material as it is fed to said reel, a circuit providing a second control signal including a resistor and a condenser serially connected across said adjustable D.C. potential source, and means for controlling the energization of said first field coil in response to a composite of said first and second control signals whereby the tension of the material being wound on the reel is controlled in a predetermined fashion over a wide range of material winding speeds.

3. In material reeling apparatus which includes a rotary reel on which material is wound, a first motor, a first electric clutch connecting said motor with said reel, and a first field coil for varying the coupling between said motor and said reel; a tension control system comprising a first generator driven by said reel and adapted to produce a first D.C. voltage signal which is a function of reel speed, a feed roll adapted to feed said material to said reel, a second motor, a second electric clutch connecting said motor with said roll, a second field coil for varying the coupling between said second motor and said roll, an adjustable D.C. potential source for controlling the energization of said second field coil to thereby control the velocity and acceleration of said material as it is fed to said reel, a circuit providing a second control signal including a resistor and a condenser serially connected across said adjustable D.C. potential source, a second generator driven by said feed roll and adapted to produce a third control signal which is a function of said material speed, and means for controlling the energization of said first field coil in response to a composite of said three signals whereby the tension of the material being wound on the reel is controlled in a predetermined fashion over a wide range of material winding speeds.

4. In material reeling apparatus which includes a rotary reel on which material is wound, a first motor, a first electric clutch connecting said motor with said reel, and a first field coil for varying the coupling between said motor and said reel; a tension control system comprising a first generator driven by said reel and adapted to produce a first D.C. voltage signal which is a function of reel speed, a feed roll adapted to feed said material to said reel, a second motor, a second electric clutch connecting said motor with said roll, a second field coil for varying the coupling between said second motor and said roll, an adjustable D.C. potential source for controlling the energization of said second field coil to thereby control the velocity and acceleration of said material as it is fed to said reel, a circuit providing a second control signal including a resistor and a condenser serially connected across said adjustable D.C. potential source, a second generator driven by said feed roll and adapted to produce a third control signal which is a function of said material speed, means for controlling the energization of said first field coil in response to a composite of said three signals, and means for controlling the energization of said second clutch in response to a composite of said adjustable D.C. potential source and said third signal whereby the tension of the material being wound on the reel is controlled in a predetermined fashion over a wide range of material winding speeds.

5. In material reeling apparatus which includes a rotary reel on which material is wound, a first motor, a first electric clutch connecting said motor with said reel, and a first field coil for varying the coupling between said motor and said reel; a tension control system comprising a first generator driven by said reel and adapted to produce an A.C. voltage having an amplitude and frequency which are proportional to said reel speed, an RC circuit across which said voltage is impressed, said RC circuit comprising a resistor series-connected with a condenser, a rectifier connected across one of said components of said RC circuit and adapted to produce a first D.C voltage signal nonlinear in relation to reel speed, a feed roll adapted to feed said material to said reel, a second motor, a second electric clutch connecting said motor with said roll, a second field coil for varying the coupling between said second motor and said roll, an adjustable D.C. potential source for controlling the energization of said second field coil to thereby control the velocity and acceleration of said material as it is fed to said reel, a circuit providing a second control signal including a second resistor and a second condenser serially connected across said adjustable D.C. potential source, a second generator driven by said feed roll and adapted to produce a third control signal which is a function of said material speed, means for controlling the energization of said first field coil in response to a composite of said three signals, and means for controlling the energization of said second clutch in response to a composite of said adjustable D.C. potential source and said third signal whereby the tension of the material being wound on the reel is controlled in a predetermined fashion over a wide range of material winding speeds.

6. In material reeling apparatus as set forth in claim 5, said tension control system further including a second adjustable D.C. potential source connected in series with said three signals to control the energization of said first field coil whereby the material tension under stall conditions may be varied.

7. In material reeling apparatus as set forth in claim 5, said electric clutches being electromagnetic clutches.

8. In material reeling apparatus as set forth in claim 5, said electric clutches being eddy-current clutches.

9. In material reeling apparatus as set forth in claim 5, said means for controlling the energization of the field coils each including a grid-controlled gaseous rectifier.

10. In material reeling apparatus as set forth in claim 5, said tension control system further including a third generator driven by said feed roll and adapted to produce a fourth control signal which is a nonlinear function of said material speed, and said first field coil is responsive to a composite of said first, second and fourth signals.

References Cited in the file of this patent

UNITED STATES PATENTS

| | | |
|---|---|---|
| 2,242,435 | Parvin et al. | May 20, 1941 |
| 2,451,901 | Auburn | Oct. 19, 1948 |
| 2,469,706 | Winther | May 10, 1949 |
| 2,512,378 | Puchlowski | June 20, 1950 |
| 2,516,038 | Wrathall | July 18, 1950 |
| 2,656,129 | De Turk et al. | Oct. 20, 1953 |
| 2,659,832 | Jaeschke | Nov. 17, 1953 |
| 2,748,299 | Weesner et al. | May 29, 1956 |
| 2,777,964 | Di Mino | Jan. 15, 1957 |
| 2,806,157 | Dustman | Sept. 10, 1957 |